United States Patent
Mori

(10) Patent No.: US 6,980,343 B2
(45) Date of Patent: Dec. 27, 2005

(54) OPTICAL SCANNING APPARATUS AND IMAGE FORMING APPARATUS USING THE SAME

(75) Inventor: Seiichiro Mori, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/966,059

(22) Filed: Oct. 18, 2004

(65) Prior Publication Data

US 2005/0094235 A1 May 5, 2005

(30) Foreign Application Priority Data

Oct. 30, 2003 (JP) ........................................ 2003-370306

(51) Int. Cl.$^7$ .............................................. G02B 26/08
(52) U.S. Cl. ....................... 359/205; 359/212; 359/216; 347/232; 347/259; 347/261
(58) Field of Search .................... 359/196–226, 359/727, 730, 850, 857–859, 871; 347/232, 243–244, 258–261

(56) References Cited

U.S. PATENT DOCUMENTS

| 4,320,959 A | 3/1982 | Morikawa et al. ............ 355/11 |
| 4,497,573 A | 2/1985 | Tokuhara et al. ............. 355/58 |
| 6,246,504 B1 * | 6/2001 | Hagelin et al. ............. 359/212 |

FOREIGN PATENT DOCUMENTS

JP            2001-228427          8/2001

* cited by examiner

Primary Examiner—James Phan
(74) Attorney, Agent, or Firm—Fitzpatrick, Cella, Harper & Scinto

(57) ABSTRACT

In an optical scanning apparatus having a light source, an incidence optical system for causing a beam emitted from the light source to be incident on a deflector, an imaging optical system for causing the beam reflected and deflected by the deflector to be imaged on a surface to be scanned, and a reflecting portion having a plurality of substantially plane reflecting mirrors disposed in an optical path between the deflector and the surface to be scanned, the reflecting portion includes a reflecting mirror of which the refractive power in a main scanning cross section is of an opposite sign. Provided are an optical scanning apparatus which does not involve structure and work for adjustment, and can obtain stable imaging performance by a simple method even if a plurality of mirrors are disposed, and an image forming apparatus using the same.

14 Claims, 5 Drawing Sheets

OPTICAL SCANNING APPARATUS AND IMAGE FORMING APPARATUS USING THE SAME

BACKGROUND OF THE INVENTION

1. Field of the Invention

This invention relates to an optical scanning apparatus and an image forming apparatus using the same, and particularly is suitable for an image forming apparatus such as a laser beam printer, a digital copying machine or a multi-function printer having, for example, an electrophotographic process adapted to deflect a beam emitted from light source means by a polygon mirror as a light deflector (deflecting means), and optically scan a surface to be scanned through the intermediary of an imaging optical system having fθ characteristic and a plurality of reflecting mirrors to thereby record image information.

2. Related Background Art

In recent years, in an imaging optical system (scanning optical system) and an image forming apparatus including the same, a higher speed and compactness have been advanced, and in order to further enhance an additional value, a further improvement in performance and structure for further compactness have been studied.

Also, regarding the resolution of an image, an image of higher definition such as 300 dpi, 600 dpi, and further 1,200 dpi is required.

To make an image so high in definition, it is necessary in designing an imaging optical system to realize higher performance by making a scanning magnification and a spot diameter at each image height being constant, and reducing the curvature of scanning lines and the curvature of image field, and further accuracy is also required in working accuracy such as the eccentricity of each lens and the disposition accuracy of an optical box.

Particularly in a color image forming apparatus of a type in which a plurality of color lights are superimposed one upon another on a plurality of photosensitive drums and a color image is output, the amount of curvature of scanning lines is important in effecting color register, and if for example, the amount of curvature of scanning lines differs on the plurality of photosensitive drums, there will arise the problem that when superimposition is effected, color misregistration occurs and the quality of image is lowered.

Also, in achieving compactness, there has heretofore been adopted a technique of making the imaging optical system wider in angle of view and shorter in focal length to thereby shorten an optical path, or bending an optical path disposed in a straight line by a mirror (reflecting mirror) to thereby make an occupied area smaller.

It is the surface accuracy of the mirror that particularly needs care when the optical path is bent by the mirror to thereby achieve compactness. If the surface accuracy is not sufficient (less planarity), there will arise the problem that the optical performance as an imaging optical system is deteriorated.

What are particularly problematic are a change in imaging magnification at each image height due to the curvature of the surface of the mirror, and the curvature of scanning lines. If, for example, the reflecting surface of the mirror which should be of a planar shape forms a convex surface, the magnification becomes an enlargement magnification, and in the end portion of the image in a main scanning direction, the scanning magnification is enlarged and the spot interval in the main scanning direction is not constant. Also in a sub-scanning direction, if the mirror is likewise of a convex surface shape, the optical path length and the angle of reflection change at the center and at the end portions of the image and the imaging position deviates to cause the curvature of scanning lines.

Therefore, the surface accuracy of the mirror need be severely controlled, and when configured by a plurality of mirrors, further high accuracy becomes necessary, and this has been a factor of a cost increasing.

Heretofore, for example, as a technique of suppressing the curvature of scanning lines, there has been disclosed a technique of positively giving the amount of curvature of one of a plurality of mirrors by adjustment to thereby correct the curvature of scanning lines (see, for example, Japanese Patent Application Laid-Open No. 2001-228427).

Basically, however, even if one mirror is adjusted, a certain accuracy is still required for the other mirrors, and this leads to the problem that the work required for the adjustment thereof depends on the accuracy of the other constructed mirrors, therefore, the amount of adjustment does not become constant and structure also becomes complicated.

SUMMARY OF THE INVENTION

The present invention has as an object thereof the provision of an optical scanning apparatus which does not involve structure and work for adjustment and can obtain stable imaging performance by a simple method even if a plurality of mirrors are disposed therein, and an image forming apparatus using the same.

Also, the present invention has an object thereof to provide an optical scanning apparatus of simple construction by omitting adjusting work, and increasing the degree of freedom of structure setting so that good optical performance may be obtained without severe surface accuracy being required, and an image forming apparatus using the same.

According to one aspect of the invention, in an optical scanning apparatus having light source means, an incidence optical system for causing a beam emitted from the light source means to be incident on deflecting means, an imaging optical system for causing the beam reflected and defected by the deflecting means to be imaged on a surface to be scanned, and a reflecting portion having a plurality of reflecting mirrors disposed in an optical path between the deflecting means and the surface to be scanned, any of the reflecting mirrors satisfies a condition that $$-0.0002 < \phi m < 0.0002,$$

where φm represents the refractive power of each of the plurality of reflecting mirrors in a main scanning cross section thereof, and the reflecting portion includes a reflecting mirror of which the refractive power in the main scanning cross section is of an opposite sign.

According to a further aspect of the invention, in the above optical scanning apparatus, a condition that $$0.9 < |\Sigma \Psi p / \Sigma \Psi m| < 1.1$$

is satisfied, where Ψp represents reflective power of the reflecting mirror having positive refractive power in the main scanning cross section thereof, Ψm represents reflective power of the reflecting mirror having negative refractive power in the main scanning cross section thereof, and ΣΨp and ΣΨm represent sums of the refractive powers of the plurality of reflecting mirrors having positive and negative refractive powers in the main scanning cross section thereof, respectively.

According to another aspect of the invention, in an optical scanning apparatus having light source means, an incidence optical system for causing a beam emitted from the light source means to be incident on deflecting means, an imaging optical system for causing the beam reflected and deflected by the deflecting means to be imaged on a surface to be scanned, and a reflecting portion having a plurality of reflecting mirrors disposed in an optical path between the deflecting means and the surface to be scanned, any of the reflecting mirrors satisfies a condition that $-0.0002 < \phi m < 0.0002$, where $\phi m$ represents the refractive power of each of the plurality of reflecting mirrors in a main scanning cross section thereof, and the plurality of reflecting mirrors are fixed and supported by supporting means so that a reflecting mirror of which the refractive power in the main scanning cross section of the reflecting mirror is of an opposite sign may be included therein.

According to a further aspect of the invention, in the above optical scanning apparatus, a condition that $0.9 < |\Sigma \Psi p / \Sigma \Psi m| < 1.1$ is satisfied, where $\Psi p$ represents refractive power of the reflecting mirror having positive refractive power in the main scanning cross section thereof, $\Psi m$ represents refractive power of the reflecting mirror having negative refractive power in the main scanning cross section thereof, and of the refractive power, and $\Sigma \Psi p$ and $\Sigma \Psi m$ represent sums of the refractive powers of the plurality of reflecting mirrors having positive and negative refractive powers in the main scanning cross section thereof, respectively.

According to a further aspect of the invention, in the above optical scanning apparatus, each of the plurality of reflecting mirrors is supported from two directions, i.e., from the reflecting surface and back surface thereof.

According to a further aspect of the invention, in the above optical scanning apparatus, the supported positions of the reflecting surfaces and back surfaces of the plurality of reflecting mirrors differ from each other in a main scanning direction.

According to a further aspect of the invention, in the above optical scanning apparatus, a condition that $0.9 < |\Sigma \Psi ps / \Sigma \Psi ms| < 1.1$ is satisfied, where $\Psi ps$ represents refractive power of the reflecting mirror having positive refractive power in the sub-scanning cross section thereof, $\Psi ms$ represents refractive power of the reflecting mirror having negative refractive power in the sub-scanning cross section thereof, and $\Sigma \Psi ps$ and $\Sigma \Psi ms$ represent sums of the refractive powers of the plurality of reflecting mirrors having positive and negative refractive powers, respectively.

According to a further aspect of the invention, in the above optical scanning apparatus, any of the reflecting mirrors satisfies a condition that $-0.0002 < \phi s < 0.0002$, where $\phi s$ represents the refractive power of each of the plurality of reflecting mirrors in the sub-scanning cross section thereof.

According to another aspect of the invention, there is provided an image forming apparatus which includes the foregoing scanning optical apparatus, a photosensitive member disposed on the surface to be scanned, a developing device for developing an electrostatic latent image formed on the photosensitive member by a light beam scanned by the optical scanning apparatus as a toner image, a transferring device for transferring the developed toner image to a transfer material, and a fixing device for fixing the transferred toner image on the transfer material.

According to another aspect of the invention, there is provided an image forming apparatus which includes the foregoing scanning optical apparatus and a printer controller for converting code data input from an external device into an image signal and inputting it to the optical scanning apparatus.

According to another aspect of the invention, there is provided a color image forming apparatus which includes the foregoing scanning optical apparatus and a plurality of image bearing members disposed on the surface to be scanned of the optical scanning apparatus for forming images of different colors thereon.

According to a further aspect of the invention, the color image forming apparatus has a printer controller for converting a color signal input from an external device into image data of different colors and inputting them to respective optical scanning apparatuses.

According to the present invention, a reflecting portion having a plurality of reflecting mirrors disposed in an optical path between deflecting means and a surface to be scanned is constituted to include a reflecting mirror of which the refractive power (the inverse number of a focal length, or optical power) in a main scanning cross section is of a different sign, whereby there can be achieved an optical scanning apparatus in which (1) main scanning magnification deviation on an image plane, the curvature of scanning lines, etc., caused by the surface accuracy of the constructed reflecting mirror are offset with the surface accuracy of the other reflecting mirrors combined therewith, by which a good performance of the optical apparatus can be maintained without the surface accuracy of each reflecting surface being made severe, whereby the manufacture of the reflecting mirrors becomes easy, (2) also, reflecting mirrors heretofore regarded as being faulty in the surface accuracy primarily determined can become usable and therefore yield can be improved and cost can be reduced, and (3) when the reflecting mirrors are fixed to a supporting member, the surface shape which is deformed and curved by pressure force is effectively made uniform, whereby it becomes possible to suppress the influence upon an image plane, whereby the degree of freedom of structure setting is enhanced and therefore, disposition accuracy becomes easy to be obtained, and an image forming apparatus using the same.

DESCRIPTION OF THE PREFERRED EMBODIMENTS

Some embodiments of the present invention will hereinafter be described with reference to the drawings.

First Embodiment

Figure 1:
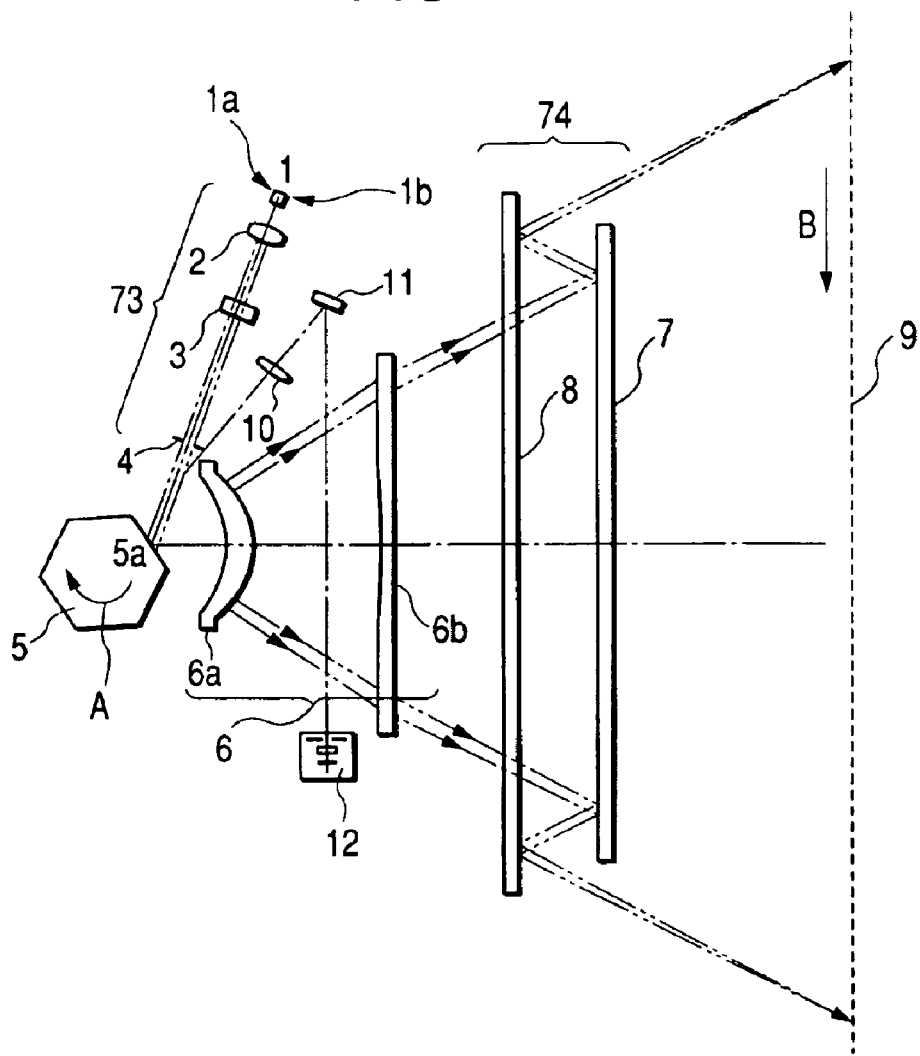
FIG. 1 is a main scanning cross-sectional view of a first embodiment of the present invention.
Figure 2:
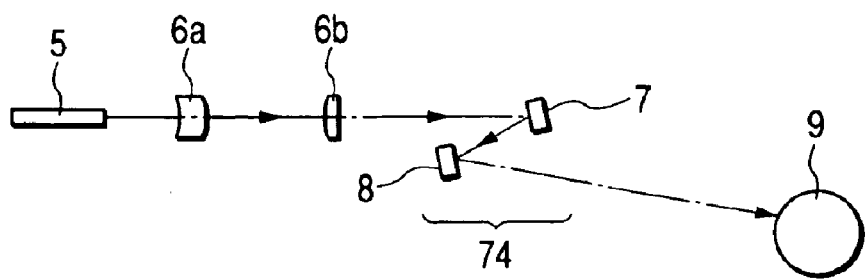
FIG. 2 is a sub-scanning cross-sectional view of the first embodiment of the present invention.

FIG. 1 is a cross-sectional view (main scanning cross-sectional view) of the essential portions of an optical scanning apparatus (multi-beam optical scanning apparatus) according to a first embodiment of the present invention in a main scanning direction, and FIG. 2 is a cross-sectional view (sub-scanning cross-sectional view) of the essential portions of FIG. 1 in a sub-scanning direction.

Here, the main scanning direction refers to a direction perpendicular to the rotation axis of the deflecting means and the optical axis of a scanning optical element (a direction in which a beam is reflected and deflected (deflected and scanned) by the deflecting means), and the sub-scanning direction refers to a direction parallel to the rotation axis of the deflecting means. Also, the main scanning cross section refers to a plane parallel to the main scanning direction and containing the optical axis of an imaging optical system. Also, the sub-scanning cross section refers to a cross section perpendicular to the main scanning cross section.

In FIGS. 1 and 2, the reference numeral 1 designates light source means comprising, for example, a multi-semiconductor laser having two light-emitting portions (light-emitting points) 1*a* and 1*b*, and disposed to effect so-called multi-scanning. While in the present embodiment, the light source means is composed of two light-emitting portions, it may be composed, for example, of a single (single beam) or three or more light-emitting portions.

The reference numeral 2 denotes a collimator lens which converts two beams emitted from the light source means 1 into a substantially parallel beam (or a substantially divergent beam or a substantially convergent beam).

The reference numeral 3 designates a cylindrical lens having predetermined refractive power in only the sub-scanning direction thereof.

The reference numeral 4 denotes an aperture (aperture stop) which has an elliptical shape and forms the two beams emerging from the cylindrical lens 3 into a desired optimum beam shape.

Each of the elements such as the collimator lens 2, the cylindrical lens 3 and the aperture 4 constitutes an element of an incidence optical system 73.

The reference numeral 5 designates a light deflector as deflecting means, which comprises, for example, a rotary polygon mirror and is rotated at a constant speed in the direction of arrow A by driving means (not shown) such as a motor.

The reference numeral 6 denotes an imaging optical system (scanning optical system) which has an fθ characteristic, and has first and second optical resin lenses (scanning lenses) 6*a* and 6*b* made of a plastic material, and causes the two beams deflected by the light deflector 5 to be imaged in a spot shape on a photosensitive drum surface (a surface to be scanned) 9 through a reflecting portion 74 which will be described later, and forms two scanning lines on the surface.

The first and second optical resin lenses 6*a* and 6*b* are formed in different shapes in the main scanning direction and in the sub-scanning direction by taking the advantage that their surface shapes can be set with a high degree of freedom by molding.

In the main scanning direction, both of the first and second optical resin lenses 6*a* and 6*b* form an aspherical shape, and have the fθ characteristic to scan the photosensitive drum surface 9 at a constant speed with the beams deflected by the light deflector 5 rotated at the constant speed.

The surface shape in the sub-scanning direction is made into such a shape as differs in curvature along the main scanning direction is done so as to maintain good imaging performance up to the periphery of an angle of view.

Further, a deflecting surface 5*a* and the photosensitive drum surface 9 are set so as to have a conjugate relation, and the beam once condensed in the sub-scanning direction near the deflecting surface 5*a* is again imaged on the photosensitive drum surface 9, thus constituting a so-called optical face tangle error correction system.

The reference numeral 74 designates a reflecting portion which has substantially plane first and second reflecting mirrors 7 and 8 each comprising a metal reflecting mirror, and is disposed in an optical path between the imaging optical system 6 and the surface 9 to be scanned, and bends the optical path to thereby achieve downsizing the entire apparatus. The reflecting portion 74 in the present embodiment is composed of first and second reflecting mirrors 7 and 8 of which the refractive power (optical power) in the main scanning cross section is of a different sign from each other.

While in FIGS. 1 and 2, two reflecting mirrors are used, this is not restrictive, and the number of the reflecting mirrors may be three or more.

The reference numeral 9 denotes the photosensitive drum surface as the surface to be scanned.

The reference numeral 10 designates a synchronism-detecting lens (BD lens) for synchronism detection which comprises an anamorphic lens made of optical resin having different surface shapes in the main scanning direction and in the sub-scanning direction.

The reference numeral 11 denotes a turn-back mirror (BD mirror) for synchronism detection, which reflects the beam from the BD lens 10 toward a synchronism-detecting portion 12. The BD mirror 11 bends an optical path to synchronism detection to thereby make the entire apparatus compact.

The reference numeral 12 designates a synchronism detecting portion which includes a stop for synchronism detection and an optical sensor (BD sensor), and adjusts the timing of the scanning start position for image recording on the photosensitive drum surface 9 by the use of a synchronizing signal (BD signal) obtained in the synchronism detecting portion 12.

Each of the elements such as the BD lens 10, the BD mirror 11 and the synchronism-detecting portion 12 constitutes an element of synchronizing position detecting means (BD optical system).

In the present embodiment, the two beams optically modulated in conformity with image information and emitted from the light source means 1 are converted into a substantially parallel beam by the collimator lens 2, and enter the cylindrical lens 3. The beam having entered the cylindrical lens 3, in the main scanning cross section, emerges in its intact state and passes through the aperture 4 (is partly intercepted). Also, in the sub-scanning cross section, it converges and passes through the aperture 4 (is partly intercepted) and is imaged as a substantially linear image (a linear image along the main scanning direction) on the deflecting surface 5a of the light deflector 5. At that time, the principal rays of the two beams are made coincident with each other by the aperture 4, and the positions thereof in the main scanning direction at which they are incident on the deflecting surface 5a are made substantially the same, to thereby suppress the imaging position deviation of each beam in the main scanning direction due to the disposition error of the photosensitive drum surface 9 and the focus deviation of the imaging optical system 6.

The two beams reflected and deflected by the deflecting surface 5a of the light deflector 5 are imaged in a spot shape on the photosensitive drum surface 9 through the intermediary of the first and second reflecting mirrors 7 and 8, and the photosensitive drum surface 9 is optically scanned with the two beams at equal speeds in the direction of arrow B (the main scanning direction) by the light deflector 5 being rotated in the direction of arrow A. Thereby, two scanning lines are formed at a time on the photosensitive drum surface 9 which is a recording medium, and image recording is effected.

At this time, in order to adjust the timing of the scanning start position on the photosensitive drum surface 9 before the photosensitive drum surface 9 is optically scanned, design is made such that part of the two beams reflected and deflected by the light deflector 5 is imaged in the main scanning direction at the stop position of the synchronism detecting portion 12 by the BD lens 10 through the BD mirror 11. The timing of the scanning start position of image recording on the photosensitive drum surface 9 can be adjusted by the use of a synchronizing signal (BD signal) obtained in the synchronism detecting portion 12.

Description will now be made of the shape and disposition of the first and second reflecting mirrors 7 and 8 according to the present invention.

The first and second reflecting mirrors 7 and 8 in the present embodiment have their reflecting surfaces formed by the vapor deposition of metal such as aluminum or chromium, and both of them are substantially plane reflecting mirrors, and are disposed by a configuration taking the mutual surface accuracy into account.

Usually the surface accuracy of the base material of a mirror, plane glass or the like, is represented by a number of Newton's fringes. As is well known, "surface accuracy 10 or less Newton's fringes" means that up to curvature comprising a radius of curvature, at which a gap corresponding to 10 Newton's fringes is produced in the direction of a normal to the surface, can be allowed.

Figure 3:
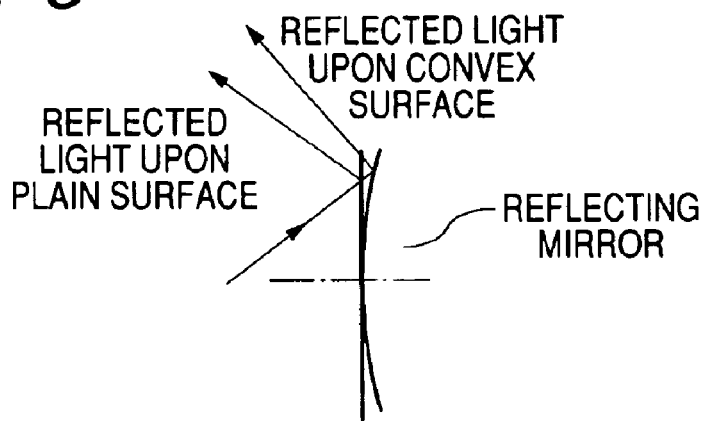
FIG. 3 shows a state in which a light beam is reflected when a reflecting mirror is of a convex surface shape.

When a mirror having curvature as described above is incorporated in an optical scanning system, if the surface of the mirror is convex on the reflecting surface side thereof as shown in FIG. 3, enlarging action will result, and the spot interval in the main scanning direction does not become constant because the angle of incidence onto the mirror depends on an image height (formed image height) and therefore the amount of optical effect also depends on the image height. This is particularly strong in its influence in the end portion of an image having a large angle of incidence. Also, if the surface of the mirror is concave on the reflecting surface side thereof, conversely there will result the effect of reducing the spot interval in the end portion of the image in the main scanning direction.

Figure 4:
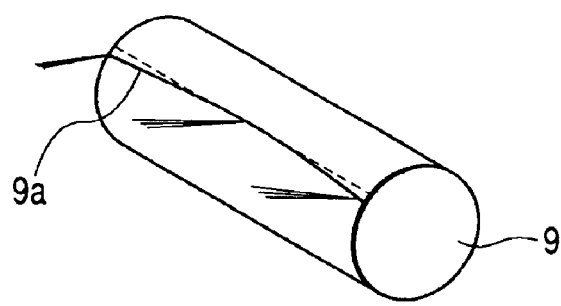
FIG. 4 shows a manner in which a scanning line is curved.

In a system for turning back a beam at an angle in the sub-scanning direction as shown in FIG. 2, besides the aforedescribed effect, the imaging position in the sub-scanning direction changes along the main scanning direction, and as a result, this appears as the curvature of a scanning line like a solid line 9a shown in FIG. 4.

It is evident that such non-uniformity of the magnification in the main scanning direction (main scanning magnification) and the curvature of the scanning line is as great in influence as to approve of the accuracy of the surface, but if the surface accuracy is prescribed with high accuracy, it will lead to an increase in cost.

So, in the present embodiment, design is made such that the surface accuracy is not only prescribed by the number of Newton's fringes of each mirror, however the surface accuracy of the constituent mirrors is uniformized to the same degree of surface accuracy, and the optical power (curvature of surface) of the surface produced in one mirror is cancelled by the surface of another mirror.

That is, if the reflecting surface of the first reflecting mirror 7 is the convex surface (an enlarging system), the reflecting surface of the second reflecting mirror 8 is made into a concave surface, and the non-uniformity of the main scanning magnification and the curvature of the scanning line occurring in the first reflecting mirror 7 are cancelled by the second reflecting mirror 8.

The two mirrors, i.e., the first and second reflecting mirrors 7 and 8, have convex and concave reflecting surfaces in the main scanning cross section, respectively, and in which the signs of the optical power in the main scanning cross section are opposite to each other and which have equal radii of curvature. As will be seen immediately, it is more effective that the difference in mutual surface accuracy is small. The reflecting portion 74 is configured so as to satisfy the following condition, $$0.9 < |\Sigma\Psi p/\Sigma\Psi m| < 1.1 \tag{1},$$

where $\Psi p$ and $\Psi m$ represent positive and negative optical powers by the curvature of the surface of reflecting mirror in the main scanning cross section, respectively, $\Sigma\Psi p$ and $\Sigma\Psi m$ represent sum of the positive and negative optical powers, respectively, when three or more reflecting mirrors are used.

Conditional expression (1) is a condition to obtain a good image plane, and if conditional expression (1) is not satisfied, the effect of mutual canceling by the mirrors will become insufficient and as a result, the non-uniformity of the magnification in the main scanning direction and the curvature of the scanning line will pose a problem, and this is not good.

More preferably, conditional expression (1) should be $$0.95 < |\Sigma\Psi p/\Sigma\Psi m| < 1.05 \tag{1a}$$

Also preferably, the reflecting portion 74 is configured so as to satisfy the following condition, $$0.9 < |\Sigma\Psi ps/\Sigma\Psi ms| < 1.1 \tag{2}$$

where $\Psi ps$ and $\Psi ms$ represent positive and negative optical powers by the curvature of the reflecting surfaces of the two reflecting mirrors 7 and 8 in the sub-scanning cross section, respectively, and $\Sigma\Psi ps$ and $\Sigma\Psi ms$ represent the sum of the positive and negative optical powers, respectively, when three or more reflecting mirrors are used.

More preferably, the reflecting portion 74 is configured so as to satisfy the following condition, $$0.95 < |\Sigma\Psi ps/\Sigma\Psi ms| < 1.05 \tag{2a}$$

Figure 5:
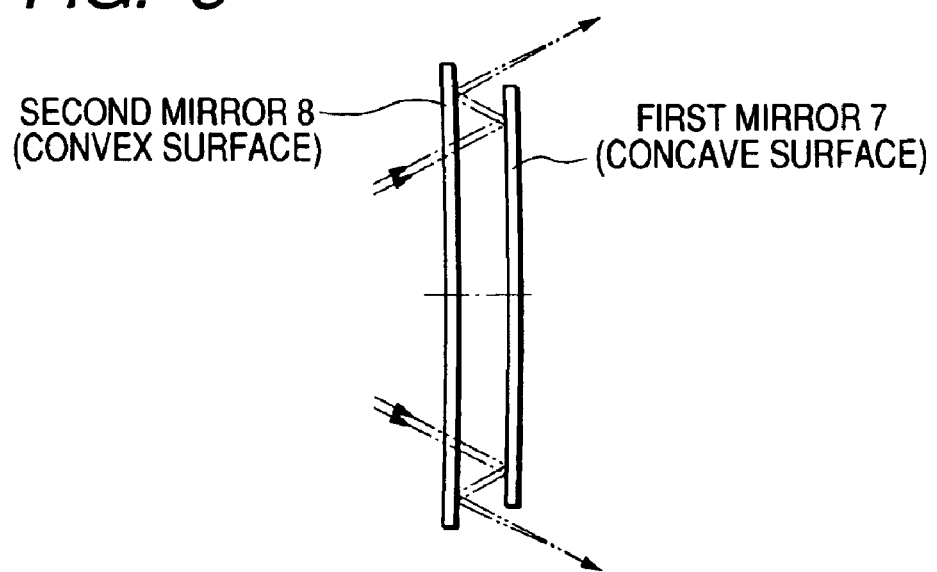
FIG. 5 shows the set state of two reflecting mirrors according to the first embodiment of the present invention.

FIG. 5 shows the constituent portions of the reflecting mirrors in the present embodiment. In FIG. 5, the curved shapes of the surfaces are represented more exaggeratedly than actual so as to make them easily understood.

The first reflecting mirror 7 is a mirror having a metal reflecting surface of 20 Newton's fringes, and the reflecting surface thereof forms a concave surface shape. The second reflecting mirror 8 likewise has a metal reflecting surface, and the surface accuracy thereof is 20 Newton's fringes opposite in sign to that of the first reflecting mirror 7, and the reflecting surface thereof forms a convex surface shape. Thereby, the curvatures of both of the first and second reflecting mirrors 7 and 8 have different signs and are of the same amount, and various aberrations occurring in the first reflecting mirror 7 can be cancelled by the second reflecting mirror 8.

In the present embodiment, the first and second reflecting mirrors 7 and 8 are substantially plane surface. Any of the reflecting mirrors satisfies:

$$-0.0002 < \phi m < 0.0002 \quad (3)$$

$$-0.0002 < \phi s < 0.0002 \quad (4)$$

where $\phi m$ and $\phi s$ represent the refractive power thereof in the main- and sub-scanning cross section, respectively.

In the present embodiment, the reflecting portion 74 is constituted by the first and second reflecting mirrors 7 and 8 having optical power shown below.

|  | Number of Newton's fringes | Optical Power |
|---|---|---|
| First reflecting mirror | 20 (per 100 mm) | $-5.0624 \times 10^{-6}$ |
| Second reflecting mirror | 20 (per 100 mm) | $5.0624 \times 10^{-6}$ |

$$\Sigma \Psi p = -5.0624 \times 10^{-6}$$

$$\Sigma \Psi m = 5.0624 \times 10^{-6}$$

From the above values, conditional expression (1) becomes $$|\Sigma \Psi p / \Sigma \Psi m| = 1.0,$$

and this just forms a relation which cancels the optical power.

If, as described above, by adopting the second reflecting mirror 8 in which whose optical power has opposite sign to that of the first refracting mirror 7, and the optical power is the same amount of power as the first reflecting mirror 7, construction can be made without deteriorating the image plane performance even if number of Newton's fringes is 10 or 20. As a result, unlike the accuracy obtained by suppressing severely heretofore, the mirrors can be manufactured relatively easily, whereby the yield is improved and a great reduction in cost can be achieved.

As the reflecting mirrors disposed between the imaging optical system 6 and the surface 9 to be scanned, reflecting mirrors having refractive power may be disposed besides reflecting mirrors having substantially plane surface satisfying the aforementioned conditional expressions (1) to (4).

While in the present embodiment, the imaging optical system 6 is composed of two lenses, this is not restrictive, however the imaging optical system 6 may be composed, for example, of a single lens or three or more lenses. Further, the imaging optical system may be constituted to include a diffraction optical element.

Second Embodiment

Figure 6:
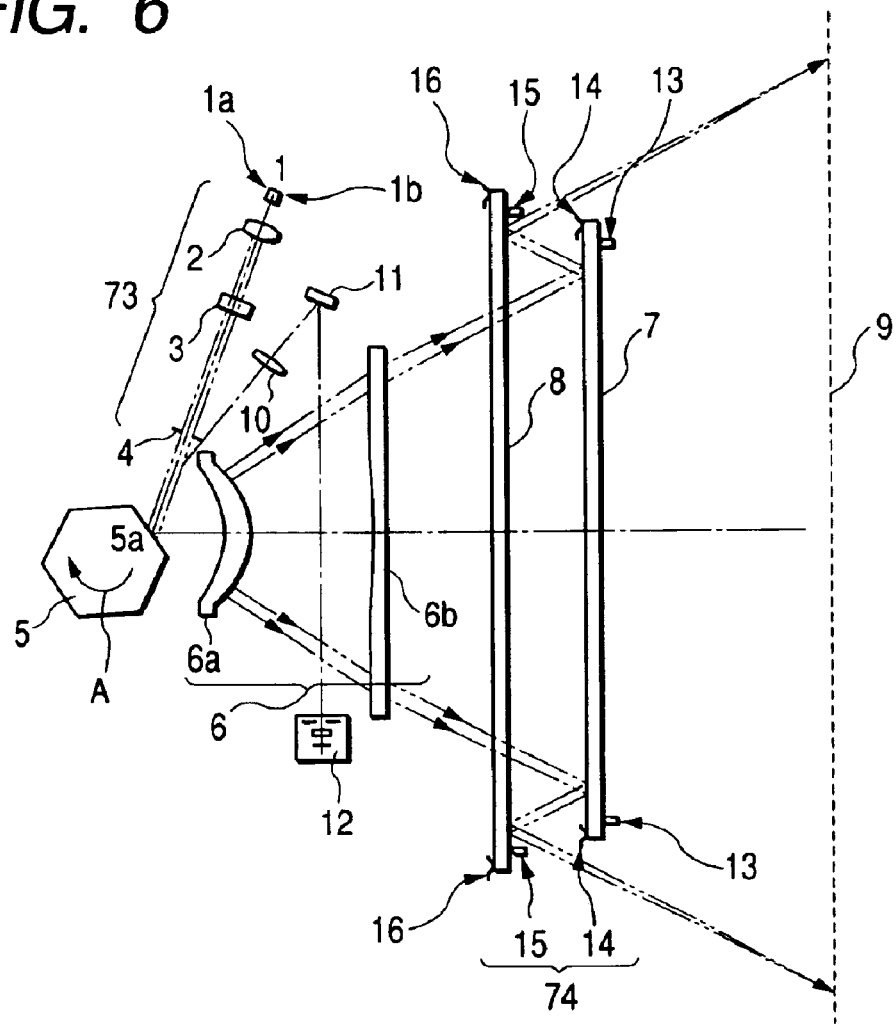
FIG. 6 is a main scanning cross-sectional view of a second embodiment of the present invention.
Figure 7:
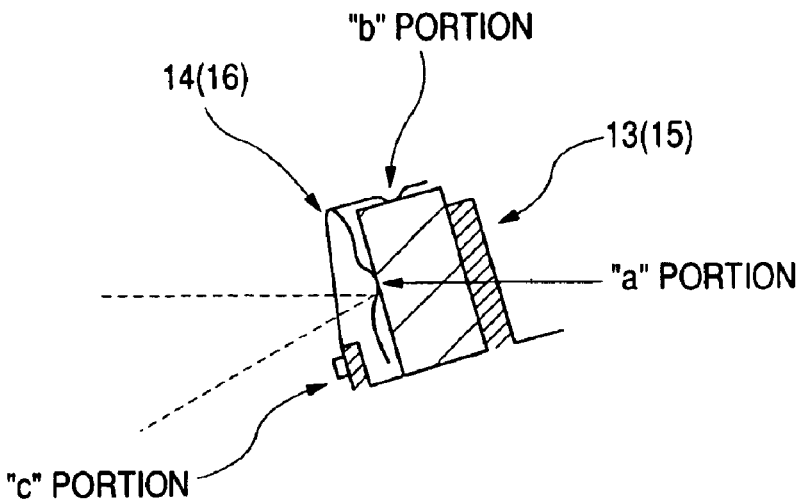
FIG. 7 is a detailed view illustrating a method of fixing and supporting a reflecting mirror according to the second embodiment of the present invention.

FIG. 6 is a main scanning cross-sectional view of an optical scanning apparatus according to a second embodiment of the present invention, and shows a state when the first and second reflecting mirrors 7 and 8 are fixed to and supported by a fixing member. FIG. 7 is a detailed view showing a method of fixing and supporting the reflecting mirrors according to the second embodiment of the present invention. In FIGS. 6 and 7, the same elements as the elements shown in FIG. 1 are given the same reference numerals.

The difference of the present embodiment from the aforedescribed first embodiment is that the first and second reflecting mirrors 7 and 8 are fixed and supported by supporting means so that the optical power thereof may differ in sign in the main scanning cross section. In the other points, the construction and optical action of the present embodiment are substantially similar to those of the first embodiment, whereby a similar effect can be obtained.

That is, the first and second reflecting mirrors 7 and 8 in the present embodiment are fixed and supported by the supporting means so that the power thereof may differ in sign in the main scanning cross section, and are supported from two directions, i.e., from the reflecting surfaces and the back surfaces thereof, at their disposed positions by the supporting means. The first and second reflecting mirrors 7 and 8 are designed to satisfy conditional expression (1) or/and conditional expression (2).

The first reflecting mirror 7 in the present embodiment, as shown in FIG. 7, has its back surface pressed against and fixed to a projected fulcrum 13 provided in an optical box by a hold-down spring member 14. The hold-down spring member 14 is of such structure that it presses the mirror from the reflecting surface side thereof at "a" portion, and is fixed to the optical box side at "c" portion by means of a screw, and the mirror is not movable in the sub-scanning direction by "b" portion.

Each of the elements such as the projected fulcrum 13(15) and the hold-down spring member 14(16) constitutes an element of the supporting means.

In this structure, the first reflecting mirror 7 is pressed against the bearing surface of the projected fulcrums 13 from the optical box over the entire surface in the sub-scanning direction, and is supported in the main scanning direction by the two points of the projected fulcrums 13 at the opposite end portions thereof. At this time, the projected fulcrums 13 of the main scanning opposite end portions are disposed 3 mm inwardly in the main scanning direction with respect to the "a" portion of the pressing portion of the hold-down spring members 14. In such a state, the reflecting surface produces a convex curvature in the main scanning direction by the pressing portions of the hold-down spring members 14.

Specifically, the curvature is convex toward the reflecting surface side having a height difference between center portion and end portion of 5λ (10 Newton's fringes) due to the fixed position difference of 3 mm in the main scanning direction.

Next, as regards the second reflecting mirror 8, conversely to the first reflecting mirror 7, projected fulcrums 15 from the optical box are disposed on the reflecting surface side thereof, and the second reflecting mirror 8 is pressed from the back surface thereof by a hold-down spring members 16. In the second reflecting mirror 8, projected fulcrums 15 are disposed 3 mm inwardly in the main scanning direction relative to the hold-down spring members 16.

Accordingly, the amount of curvature of the mirror produced by the disposition deviation in the main scanning direction between the hold-down spring member 16 and the projected fulcrum 15 is 5λ (10 Newton's fringes) as in the first reflecting mirror 7, however it will be readily understood that the curvature is concave toward the reflecting surface side conversely to the first reflecting mirror 7.

The amount of curvature of the mirror is substantially determined by the pressure force of the hold-down spring, the difference amount between the fixed positions of the front surface and back surface, and the thickness of the mirror.

In the present embodiment, pressing has been effected at the thickness 5 mm of the mirror and the pressure force 1 kg of the spring, the thickness of the mirror and the pressure force of the spring can of course be suitably set.

Also, while the positional difference for holding down the mirror in the main scanning direction is 3 mm, this is not restrictive, however a structurally possible position can be suitably set and the mirror can be disposed thereat, and this leads to an advantage that when the space around the mirror is adjacent to other part, a necessary space is easy to obtain. Therefore, the degree of freedom of structure setting increases, and disposition becomes possible without an unreasonable construction being extorted and therefore, there can be constructed an optical scanning apparatus of high performance of which the manufacturing accuracy is easy to obtain.

The relation between the curvatures of the first reflecting mirror 7 and the second reflecting mirror 8 in the present embodiment is just converse to the relation in the aforedescribed first embodiment. That is, in the present embodiment, the first reflecting mirror 7 has surface accuracy of 10 Newton's fringes and the reflecting surface thereof is of a convex surface shape, and the second reflecting surface 8 forms a concave surface shape of surface accuracy of 10 Newton's fringes opposite in sign to the first reflecting mirror 7.

Thereby, the curvatures of the two reflecting mirrors differ in sign and are of the same amount, and as in the first embodiment, various aberrations occurring in the first reflecting mirror 7 can be cancelled by the second reflecting mirror 8.

In the present embodiment, the first and second reflecting mirrors 7 and 8 are fixed and supported so as to have surface power shown below.

| | Number of Newton's fringes | Optical Power |
|---|---|---|
| First reflecting mirror | 10 (per 100 mm) | $2.5312 \times 10^{-6}$ |
| Second reflecting mirror | 10 (per 100 mm) | $-2.5312 \times 10^{-6}$ |

$\Sigma\Psi p = 2.5312 \times 10^{-6}$ $\Psi m = -2.5312 \times 10^{-6}$

From the above values, conditional expression (1) becomes $|\Sigma\Psi p / \Sigma\Psi m| = 1.0$ and this just forms a relation which cancels the optical power.

Thus, in the present embodiment, as described above, the first and second reflecting mirrors 7 and 8 are fixed and supported by the fixing means so that the optical power thereof may differ in sign in the main scanning cross section, whereby there is obtained an effect similar to that of the aforedescribed first embodiment.

In the present embodiment, it is more preferable that the first and second reflecting mirrors be fixed and supported by the fixing means so that the optical power thereof may differ in sign in the sub-scanning cross section.

Third Embodiment

Figure 8:
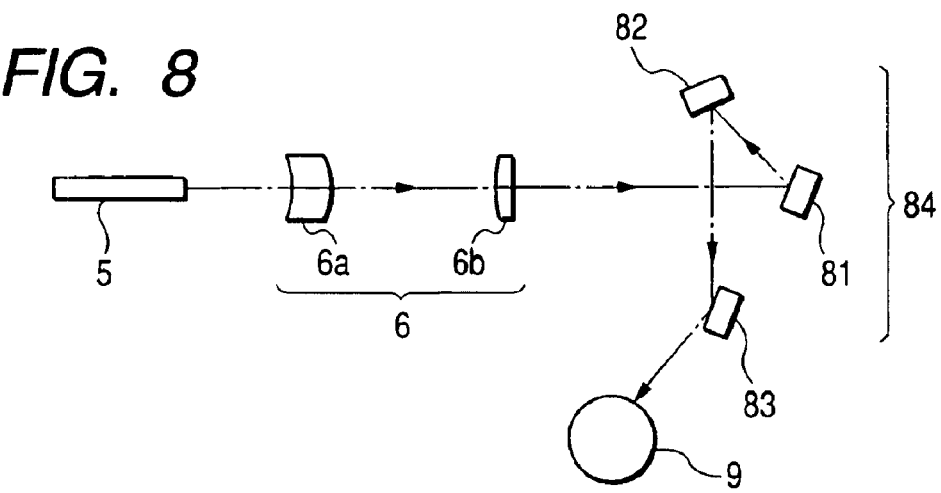
FIG. 8 is a sub-scanning cross-sectional view showing the set state of three reflecting mirrors according to a third embodiment of the present invention.

FIG. 8 is a sub-scanning cross-sectional view of an optical scanning apparatus according to a third embodiment of the present invention. In FIG. 8, the same elements as the elements shown in FIG. 1 are given the same reference numerals.

The difference of the present embodiment from the aforedescribed first embodiment is that a reflecting portion 84 is composed of three reflecting mirrors, i.e., first, second and third reflecting mirrors 81, 82 and 83, and the optical power of each reflecting mirror is set so as to satisfy conditional expression (1) or/and conditional expression (2). In the other points, the construction and optical action of the present embodiment are substantially similar to those of the first embodiment, whereby a similar effect is obtained.

That is, in the case of a construction in which the number of reflecting mirrors is three or more, the optical powers of the reflecting mirrors are classified according to its sign, and summed them respectively, and the reflecting mirrors are constructed so that the positive optical power and the negative optical power may satisfy the above-mentioned conditional expression (1) or/and (2), thereby obtaining an effect similar to that of the aforedescribed first embodiment.

In the present embodiment, the reflecting surfaces of the second and third reflecting mirrors 82 and 83 are constituted by convex surfaces of which the curvatures are of the same sign, and the reflecting surface of the first reflecting mirror 81 is constituted by a concave surface of a opposite sign relative to the optical power of the second and third reflecting mirrors 82 and 83.

In the present embodiment, the reflecting portion 84 is constituted by the first, second and third reflecting mirrors 81, 82 and 83 having optical power shown below.

| | Number of Newton's fringes | Optical Power |
|---|---|---|
| First reflecting mirror | −22 (per 100 mm) | $-5.5686 \times 10^{-6}$ |
| Second reflecting mirror | 11 (per 100 mm) | $2.7843 \times 10^{-6}$ |
| Third reflecting mirror | 12 (per 100 mm) | $3.0374 \times 10^{-6}$ |

$\Sigma\Psi p = (2.7843 \times 10^{-6} + 3.0374 \times 10^{-6}) = 5.8217 \times 10^{-6}$ $\Sigma\Psi m = -5.5686 \times 10^{-6}$ $|\Sigma\Psi p / \Sigma\Psi m| = 1.05$ This satisfies conditional expression (1).

If the mirrors are thus selected and constructed so that good performance may be obtained as a whole, the surface accuracy of the respective mirrors need not always be severely suppressed equally and therefore, usable range for mirrors heretofore having regarded as being faulty become wider, and the yield can be greatly improved.

The Other Embodiment

When the reflecting portion is composed, for example, of four reflecting mirrors, i.e., first, second, third and fourth reflecting mirrors, the reflecting surfaces of the first and second reflecting mirrors can be constituted by convex surfaces of which the curvatures are of the same sign and the reflecting surfaces of the third and fourth reflecting mirrors can be constituted by concave surfaces of which the curvatures are of an opposite sign relative to the optical power of the first and second reflecting mirrors.

(Image Forming Apparatus)

Figure 9:
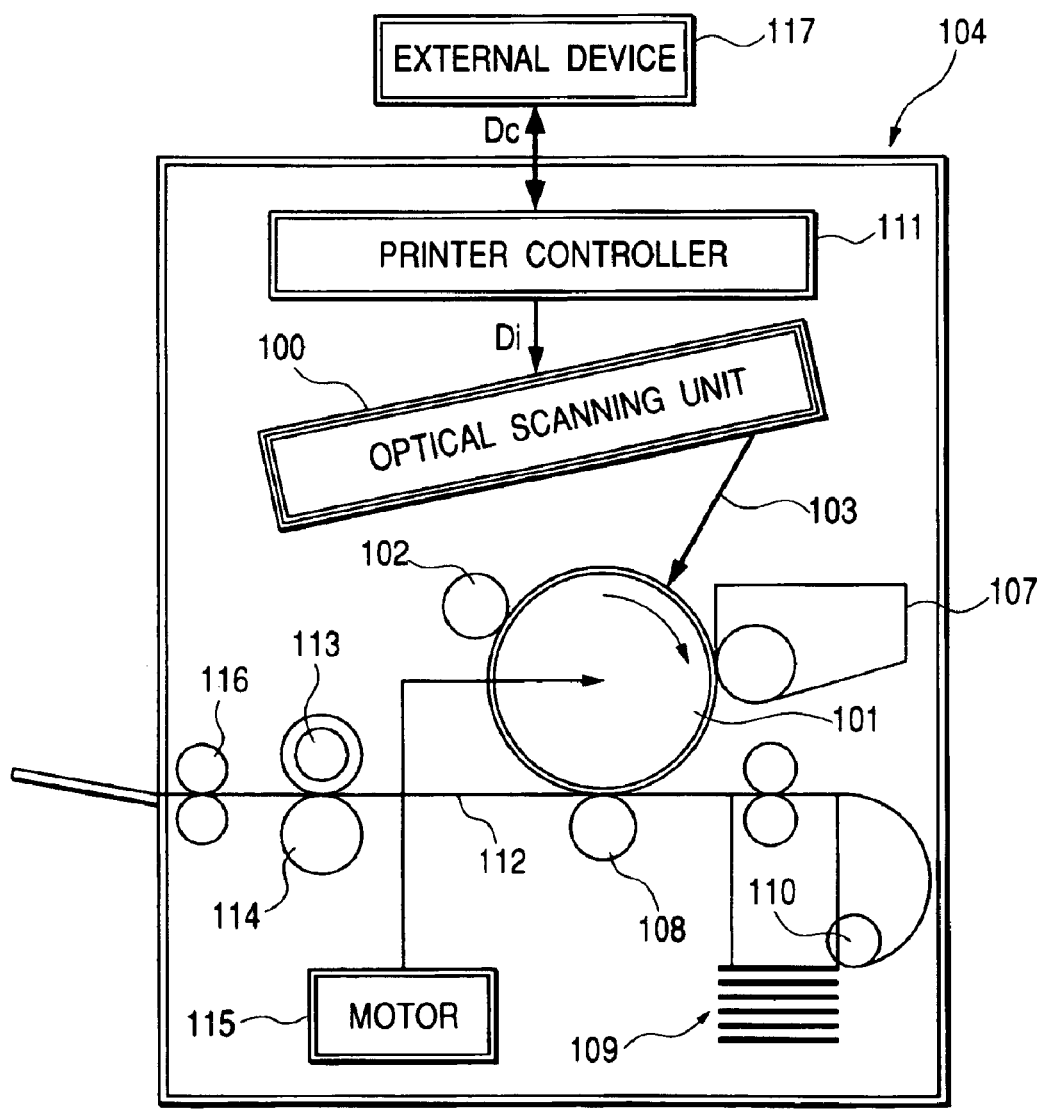
FIG. 9 is a sub-scanning cross-sectional view showing an embodiment of the image forming apparatus of the present invention.

FIG. 9 is a cross-sectional view of the essential portions of an embodiment of the image forming apparatus of the present invention in the sub-scanning direction. In FIG. 9, the reference numeral 104 designates the image forming apparatus. Code data Dc is input from an external device 117 such as a personal computer to this image forming apparatus 104. This code data Dc is converted into image data (dot data) Di by a printer controller 111 in the image forming apparatus. This image data Di is input to an optical scanning unit 100 having the construction shown in any one of the first to third embodiments. A light beam 103 modulated in conformity with the image data Di is emitted from this optical scanning unit 100, and the photosensitive surface of a photosensitive drum 101 is scanned in the main scanning direction with this light beam 103.

The photosensitive drum 101 which is an electrostatic latent image bearing member (photosensitive member) is clockwisely rotated by a motor 115. With this rotation, the photosensitive surface of the photosensitive drum 101 is moved relative to the light beam 103 in the sub-scanning direction orthogonal to the main scanning direction. Above the photosensitive drum 101, a charging roller 102 for uniformly charging the surface of the photosensitive drum 101 is provided so as to contact with the surface of the photosensitive drum. The light beam 103 scanned by the optical scanning unit 100 is adapted to be applied to the surface of the photosensitive drum 101 charged by the charging roller 102.

As previously described, the light beam 103 is modulated on the basis of the image data Di, and this light beam 103 is applied to the photosensitive drum 101 to thereby form an electrostatic latent image on the surface of the photosensitive drum 101. This electrostatic latent image is developed as a toner image by a developing device 107 disposed so as to contact with the photosensitive drum 101 further downstream of the irradiation position of the light beam 103 with respect to the direction of rotation of the photosensitive drum 101.

The toner image developed by the developing device 107 is transferred to paper 112, which is a transfer material, by a transfer roller 108 disposed below the photosensitive drum 101 so as to be opposed to the photosensitive drum 101. The paper 112 is contained in a paper cassette 109 forward (rightward as viewed in FIG. 9) of the photosensitive drum 101, however can also be manually fed. A paper feeding roller 110 is disposed at an end portion of the paper cassette 109, and feeds the paper 112 in the paper cassette to a conveying path.

The paper 112 to which the unfixed toner image has been transferred in the manner described above is further conveyed to a fixing device rearward (leftward as viewed in FIG. 9) of the photosensitive drum 101. The fixing device is composed of a fixing roller 113 having a fixing heater (not shown) therein, and a pressure roller 114 disposed so as to be in pressure contact with this fixing roller 113, and pressurizes and heats the paper 112 conveyed from the transferring portion by the pressure contact portion between the fixing roller 113 and the pressure roller 114 to thereby fix the unfixed image on the paper 112. Further, paper discharging rollers 116 are disposed rearward of the fixing roller 113 and discharges the fixed paper 112 out of the image forming apparatus.

Although not shown in FIG. 9, the printer controller 111 effects not only the aforedescribed conversion of the data, but also the control of various portions in the image forming apparatus including a motor 115, a polygon motor in the optical scanning unit which will be described later, etc.

(Color Image Forming Apparatus)

Figure 10:
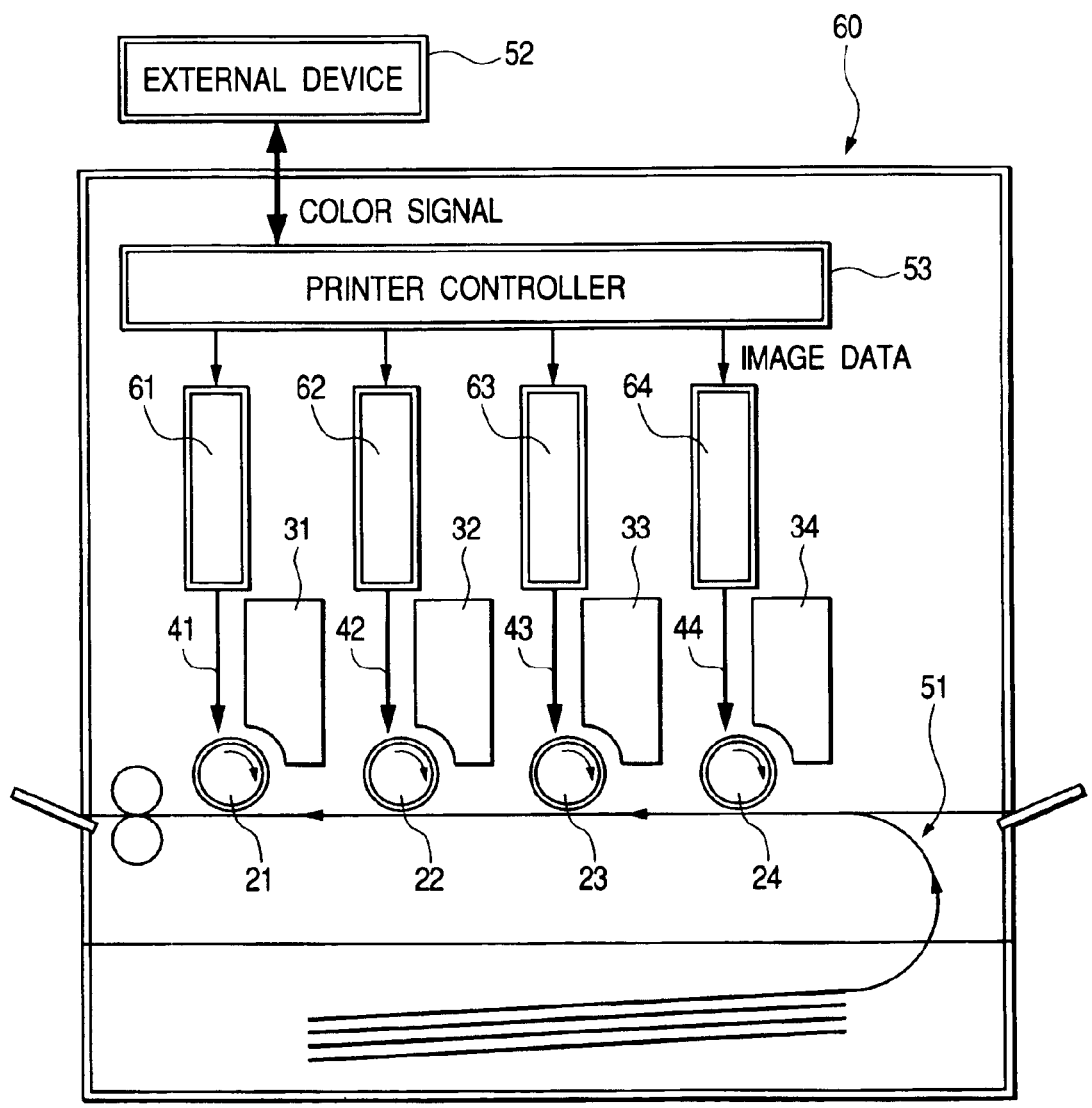
FIG. 10 is a schematic view of the essential portions of a color image forming apparatus according to an embodiment of the present invention.

FIG. 10 is a schematic view of the essential portions of a color image forming apparatus according to an embodiment of the present invention. The present embodiment is a tandem type color image forming apparatus in which four optical scanning apparatuses are arranged side by side and image information is recorded on the surfaces of photosensitive drums which are image bearing members arranged in parallel. In FIG. 10, the reference numeral 60 designates the color image forming apparatus, the reference numerals 61, 62, 63 and 64 denote optical scanning apparatuses having the construction shown in any one of the first to third embodiments, the reference numerals 21, 22, 23 and 24 designate photosensitive drums as image bearing members, the reference numerals 31, 32, 33 and 34 denote developing devices, and the reference numeral 51 designates a conveying belt.

In FIG. 10, red (R), green (G), and blue (B) color signals are input from an external device 52 such as a personal computer to the color image forming apparatus 60. These color signals are converted into cyan (C), magenta (M), yellow (Y), and black (B) image data (dot data) by a printer controller 53 in the color image forming apparatus. These image data are input to the optical scanning apparatuses 61, 62, 63 and 64, respectively. Light beams 41, 42, 43 and 44 modulated in conformity with the respective image data are emitted from these optical scanning apparatuses, and the photosensitive surfaces of the photosensitive drums 21, 22, 23 and 24 are scanned in the main scanning direction with these light beams.

The color image forming apparatus according to the present embodiment has four optical scanning apparatuses (61, 62, 63, 64) arranged side by side, and records image signals (image information) corresponding to cyan (C), magenta (M), yellow (Y), and black (B) colors on the surfaces of the photosensitive drums 21, 22 23 and 24 arranged in parallel to thereby print a color image at a high speed.

The color image forming apparatus according to the present embodiment, as described above, forms latent images of the respective colors on the surfaces of the corresponding photosensitive drums 21, 22, 23 and 24 by the four optical scanning apparatuses 61, 62, 63 and 64 by the use of the light beams based on the respective image data. Thereafter, the images are multiplexly transferred to a recording material to thereby form a sheet of full-color image.

As the external device 52, use may also be made, for example, of a color image reading apparatus provided with a CCD sensor. In this case, a color digital copying machine is constituted by this color image reading apparatus and the color image forming apparatus 60.

This application claims priority from Japanese Patent Application No. 2003-370306 filed on Oct. 30, 2003, which is hereby incorporated by reference herein.

What is claimed is:

1. An optical scanning apparatus having light source means, an incidence optical system for causing a beam emitted from the light source means to be incident on deflecting means, an imaging optical system for causing the beam reflected and deflected by the deflecting means to be imaged on a surface to be scanned, and a reflecting portion having a plurality of reflecting mirrors disposed in an optical path between the deflecting means and the surface to be scanned, wherein any of the reflecting mirrors satisfies a condition that $$-0.0002 < \phi m < 0.0002,$$

where $\phi m$ represents refractive power of each of the plurality of reflecting mirrors in a main scanning cross section thereof, and wherein the reflecting portion includes a reflecting mirror of which the refractive power in the main scanning cross section is of an opposite sign.

2. An optical scanning apparatus according to claim 1, wherein a condition that $$0.9 < |\Sigma \Psi p / \Sigma \Psi m| < 1.1$$

is satisfied, where $\Psi p$ represents refractive power of the reflecting mirror having positive refractive power in the main scanning cross section thereof, $\Psi m$ represents refractive power of the reflecting mirror having negative refractive power in the main scanning cross section thereof, and $\Sigma \Psi p$ and $\Sigma \Psi m$ represent sums of the refractive powers of the plurality of reflecting mirrors having positive and negative refractive powers in the main scanning cross section thereof, respectively.

3. An optical scanning apparatus having light source means, an incidence optical system for causing a beam emitted from the light source means to be incident on deflecting means, an imaging optical system for causing the beam reflected and deflected by the deflecting means to be imaged on a surface to be scanned, and a reflecting portion having a plurality of reflecting mirrors disposed in an optical path between the deflecting means and the surface to be scanned, wherein any of the reflecting mirrors satisfies a condition that $$-0.0002 < \phi m < 0.0002,$$

where $\phi m$ represents refractive power of each of the plurality of reflecting mirrors in a main scanning cross section thereof, and wherein the plurality of reflecting mirrors are fixed and supported by supporting means so that a reflecting mirror of which the refractive power in the main scanning cross section of the reflecting mirror is of an opposite sign may be included therein.

4. An optical scanning apparatus according to claim 3, wherein a condition that $$0.9 < |\Sigma \Psi p / \Sigma \Psi m| < 1.1$$

is satisfied, where $\Psi p$ represents refractive power of the reflecting mirror having positive refractive power in the main scanning cross section thereof, $\Psi m$ represents refractive power of the reflecting mirror having negative refractive power in the main scanning cross section thereof, and $\Sigma \Psi p$ and $\Sigma \Psi m$ represent sums of the refractive powers of the plurality of reflecting mirrors having positive and negative refractive powers in the main scanning cross section thereof, respectively.

5. An optical scanning apparatus according to claim 3, wherein each of the plurality of reflecting mirrors is supported from a reflecting surface and a back surface.

6. An optical scanning apparatus according to claim 3, wherein supported positions of reflecting surfaces and of back surfaces of the plurality of reflecting mirrors differ from each other in a main scanning direction.

7. An optical scanning apparatus according to claim 1, wherein a condition that $$0.9 < |\Sigma \Psi ps / \Sigma \Psi ms| < 1.1$$

is satisfied, where $\Psi ps$ represents refractive power of the reflecting mirror having positive refractive power in the sub-scanning cross section thereof, $\Psi ms$ represents refractive power of the reflecting mirror having negative refractive power in the sub-scanning cross section thereof, and $\Psi ps$ and $\Psi ms$ represent sums of the refractive powers of the plurality of reflecting mirrors having positive and negative refractive powers, respectively.

8. An optical scanning apparatus according to claim 3, wherein a condition that $$0.9 < |\Sigma \Psi ps / \Sigma \Psi ms| < 1.1$$

is satisfied, where $\Psi ps$ represents refractive power of the reflecting mirror having positive refractive power in the sub-scanning cross section thereof, $\Psi ms$ represents refractive power of the reflecting mirror having negative refractive power in the sub-scanning cross section thereof, and $\Sigma \Psi ps$ and $\Sigma \Psi ms$ represent sums of the refractive powers of the plurality of reflecting mirrors having positive and negative refractive powers, respectively.

9. An optical scanning apparatus according to claim 1, wherein any of the reflecting mirrors satisfies a condition that $$-0.0002 < \phi s < 0.0002,$$

where $\phi s$ represents refractive power of each of the plurality of reflecting mirrors in the sub-scanning cross section thereof.

10. An optical scanning apparatus according to claim 3, wherein any of the reflecting mirrors satisfies a condition that $$-0.0002 < \phi s < 0.0002,$$

where $\phi s$ represents refractive power of each of the plurality of reflecting mirrors in the sub-scanning cross section thereof.

11. An image forming apparatus having an optical scanning apparatus according to any one of claims 1 to 10, a photosensitive member disposed on the surface to be scanned, a developing device for developing an electrostatic latent image formed on the photosensitive member by a light beam scanned by the optical scanning apparatus as a toner image, a transferring device for transferring the developed toner image to a transfer material, and a fixing device for fixing the transferred toner image on the transfer material.

12. An image forming apparatus having an optical scanning apparatus according to claim 11, and a printer controller for converting code data input from an external device into an image signal and inputting it to the optical scanning apparatus.

13. A color image forming apparatus having a plurality of image bearing members disposed on the surface to be scanned of an optical scanning apparatus according to any one of claims 1 to 10 for forming images of different colors from each other.

14. A color image forming apparatus according to claim 13, having a printer controller for converting a color signal input from an external device into image data of different colors and inputting them to respective optical scanning apparatuses.

* * * * *

UNITED STATES PATENT AND TRADEMARK OFFICE
CERTIFICATE OF CORRECTION

PATENT NO. : 6,980,343 B2
APPLICATION NO. : 10/966059
DATED : December 27, 2005
INVENTOR(S) : Mori It is certified that error appears in the above-identified patent and that said Letters Patent is hereby corrected as shown below:

COLUMN 11
Line 61, "$\Psi m=$" should read --$\Sigma\Psi m=$ --.

COLUMN 16
Line 19, "$\Psi ps$" should read --$\Sigma\Psi ps$--.
Line 20, "$\Psi ms$" should read --$\Sigma\Psi ms$--.

Signed and Sealed this

Twenty-sixth Day of June, 2007

JON W. DUDAS
*Director of the United States Patent and Trademark Office*